(No Model.)
R. H. FRANKLIN.
APPARATUS FOR FILTERING AND COOLING WATER.
No. 249,608. Patented Nov. 15, 1881.
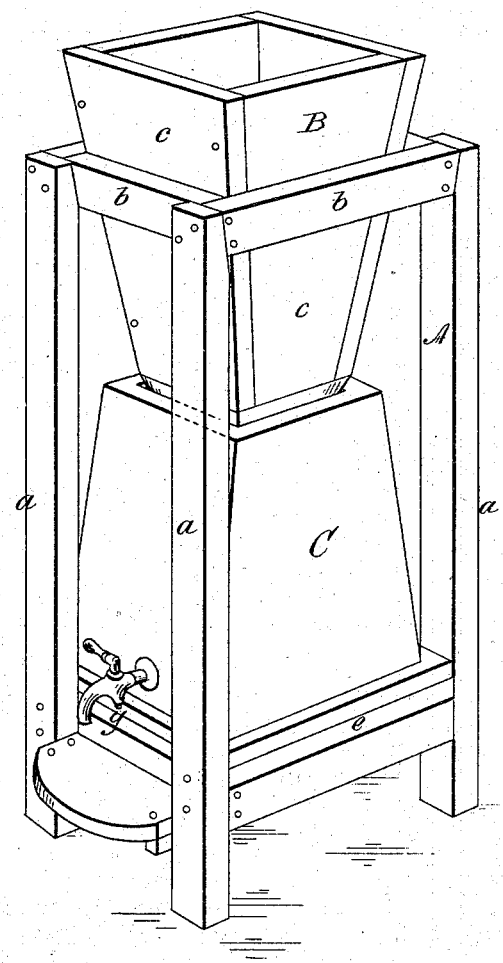
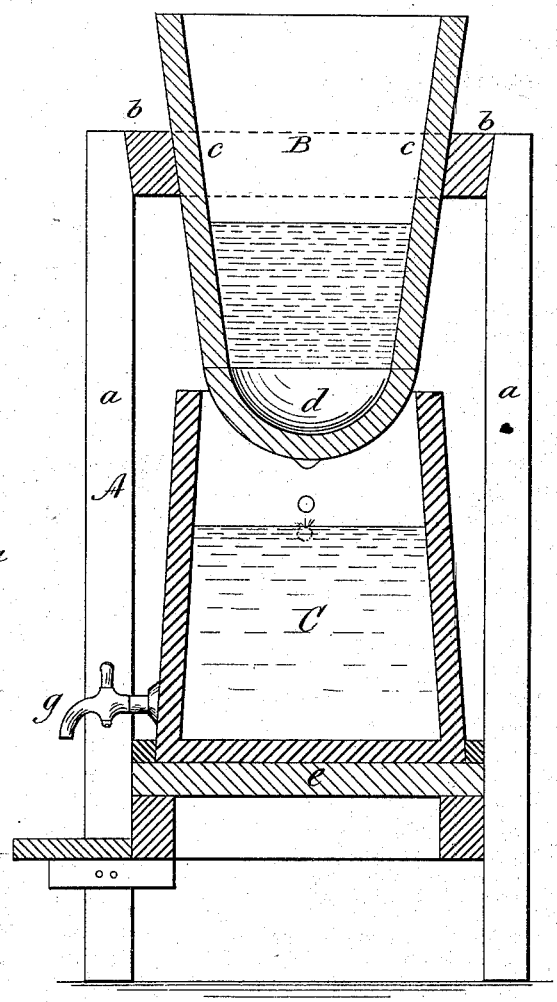

UNITED STATES PATENT OFFICE.

ROBERT H. FRANKLIN, OF GUADALAJARA, MEXICO.

APPARATUS FOR FILTERING AND COOLING WATER.

SPECIFICATION forming part of Letters Patent No. 249,608, dated November 15, 1881.

Application filed August 2, 1881. (No model.)

*To all whom it may concern:*

Be known that I, ROBERT H. FRANKLIN, of Guadalajara, Mexico, have invented a new and Improved Apparatus for Filtering and Cooling Water, of which the following is a specification.

The object of my invention is to furnish a portable and effective apparatus for family and hotel use by which a supply of filtered and cool water can be kept on hand for use as required.

The invention consists, first, in a water-receptacle constructed of filtering material; and, second, in the combination therewith of a vessel of porous material, in which the water is cooled by evaporation from the outer surface, all as hereinafter described and claimed.

In the accompanying drawings, Figure 1 is a perspective view of the apparatus, and Fig. 2 is a vertical section of the same.

Similar letters of reference indicate corresponding parts.

A is a stand on which the filtering-vessels are sustained. This stand may be of any suitable form and construction. As shown, it consists of four posts, *a*, and upper and lower supports for the vessels.

B is the filtering vessel or receptacle, having sides *c* and bottom *d* formed by slabs of filtering-stone, or other material of a porous nature, suitable for filtering purposes. In shape the vessel B is preferably square, as shown, with tapering sides, and the size will be according to amount of water required. The whole vessel being of the filtering material, an extensive filtering-surface is obtained by a vessel of comparatively small size. The vessel B is supported at the upper part of stand A by the strips *b b*.

C is the cooler, consisting of a hollow vessel of any suitable form, supported by the shelf *e* below the filter B, so as to receive the water therefrom. The vessel C is earthenware baked by a low heat, so that it retains its porous character and will absorb the water. The evaporation from the outer surface of such vessel has the effect to keep the water therein cool.

In operation the water to be filtered is supplied to vessel B, and passing through the bottom and sides of the same collects on the under side of the bottom, from whence it drops into the vessel C and accumulates. A supply of filtered and cooled water is thus kept in vessel C. The vessel C is provided with a faucet, *g*, for convenience of drawing the water.

The vessels B C can be readily removed from the stand for cleaning.

The apparatus is portable and adapted for family and hotel use.

I am aware that it is not broadly new to make a reservoir for holding water of earthenware, and I therefore do not claim such; but

What I claim, and desire to secure by Letters Patent, is—

In a filtering apparatus, the combination, with the side bars, *b*, and the shaft *e*, of the filtering-vessel B, constructed of slabs of filtering material and supported by the said bars, and the cooler C, made of porous material and supported upon the said shelf under the filtering-vessel, substantially as shown and described.

ROBERT H. FRANKLIN.

Witnesses:
GEO. D. WALKER,
C. SEDGWICK.